United States Patent
Gulick

(10) Patent No.: US 6,601,178 B1
(45) Date of Patent: *Jul. 29, 2003

(54) SYSTEM POWER MANAGEMENT PARTITIONED ACROSS A SERIAL BUS

(75) Inventor: Dale E. Gulick, Austin, TX (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 957 days.

(21) Appl. No.: 08/929,153

(22) Filed: Sep. 11, 1997

Related U.S. Application Data

(63) Continuation-in-part of application No. 08/802,321, filed on Feb. 18, 1997, now Pat. No. 6,058,443.

(51) Int. Cl.⁷ .................................................. G06F 1/28
(52) U.S. Cl. ........................ 713/322; 713/323; 713/300
(58) Field of Search ....................... 395/750.04, 750.05, 395/750.01, 750; 713/322, 323, 300

(56) References Cited

U.S. PATENT DOCUMENTS

| | | | |
|---|---|---|---|
| 4,683,530 A | 7/1987 | Quatse ........................ | 364/200 |
| 5,390,191 A | 2/1995 | Shiono et al. .............. | 371/22.3 |
| 5,410,542 A | 4/1995 | Gerbehy et al. ............ | 370/85.1 |
| 5,455,740 A | 10/1995 | Burns .......................... | 361/735 |
| 5,461,649 A * | 10/1995 | Bailey et al. .................. | 327/28 |

(List continued on next page.)

OTHER PUBLICATIONS

Fernald, Kenneth W. et al., "A System Architecture for Intelligent Implantable Biotelemetry Instruments", IEEE Engineering in Medicine & Biology Society 11$^{th}$ Annual International Conference, vol. 11, 1989, pp. 1411–1412.
Common Architecture, "Desktop PC/AT systems", Mar. 21, 1996, Version .93 Preliminary, pp. 1–26.
Intel, "82371FB (PIIX) and 82371SB (PIIX3) PCI ISA IDE Xcelerator", May 1996, pp. 1–118.
Advanced Micro Devices, "AM7968/Am7969 TAXIchip™ Article Reprints", Jan. 22, 1987, pp. 1–77, particularly pp. 67–72.
National Semiconductor, "PC87306 SuperI/O™ Enhanced Sidewinder Lite Floppy Disk Controller, Keyboard Controller, Real–Time Clock, Dual UARTs, Infrared Interface, IEEE 1284 Parallel Port, and IDE Interface", Preliminary—Nov. 1995, pp. 1–110.
"Advanced Configuration and Power Interface Specification,"Revision 1.0, Dec. 1996, pp. 1–1 thru 16–261, (particularly Chapter 4, pp. 4–34 thru 4–73).

Primary Examiner—Xuan M. Thai
Assistant Examiner—Tim Vo
(74) Attorney, Agent, or Firm—Zagorin, O'Brien & Graham, LLP

(57) ABSTRACT

An indication is provided to a first integrated circuit that a wake-up event has occurred on an input terminal of a second integrated circuit where the first and second integrated circuit are coupled by a bus. The bus is initially in a reduced power consumption state. One of the signal lines of the bus is changed from a first voltage level to a second voltage level in response to a wake-up event recognized by the second integrated circuit. The bus is changed from the reduced power consumption state to a normal power consumption state in response to the at least one signal line being at the second voltage level.

24 Claims, 8 Drawing Sheets

U.S. PATENT DOCUMENTS

| | | | |
|---|---|---|---|
| 5,557,757 A | | 9/1996 | Gephardt et al. ............ 395/306 |
| 5,669,003 A | * | 9/1997 | Carmean et al. ........ 395/750.04 |
| 5,694,607 A | * | 12/1997 | Dunstan et al. .............. 395/750 |
| 5,696,912 A | | 12/1997 | Bicevskis et al. ............ 395/308 |
| 5,727,171 A | | 3/1998 | Iachetta, Jr. ................. 395/287 |
| 5,734,840 A | | 3/1998 | Chew et al. ................. 395/282 |
| 5,740,387 A | | 4/1998 | Lambrecht et al. .......... 395/309 |
| 5,790,873 A | * | 8/1998 | Popper et al. .......... 395/750.01 |
| 5,794,058 A | * | 8/1998 | Resnick .................. 395/750.05 |
| 5,805,910 A | * | 9/1998 | Lee et al. ............... 395/750.05 |
| 5,809,314 A | * | 9/1998 | Carmean et al. ........ 395/750.04 |
| 5,835,733 A | * | 11/1998 | Walsh et al. ................. 395/281 |

\* cited by examiner

| 7 | 6 | 5 | 4 | 3 | 2 | 1 | 0 |
|---|---|---|---|---|---|---|---|
| Wake-Up B Bit 3 | Wake-Up B Bit 2 | Wake-Up B Bit 1 | Wake-Up B Bit 0 | Wake-Up A Bit 3 | Wake-Up A Bit 2 | Wake-Up A Bit 1 | Wake-Up A Bit 0 |
| 15 | 14 | 13 | 12 | 11 | 10 | 9 | 8 |
| Wake-Up D Bit 3 | Wake-Up D Bit 2 | Wake-Up D Bit 1 | Wake-Up D Bit 0 | Wake-Up C Bit 3 | Wake-Up C Bit 2 | Wake-Up C Bit 1 | Wake-Up C Bit 0 |

FIG. 10A

| 7 | 6 | 5 | 4 | 3 | 2 | 1 | 0 |
|---|---|---|---|---|---|---|---|
| Wake-Up F Bit 3 | Wake-Up F Bit 2 | Wake-Up F Bit 1 | Wake-Up F Bit 0 | Wake-Up E Bit 3 | Wake-Up E Bit 2 | Wake-Up E Bit 1 | Wake-Up E Bit 0 |
| 15 | 14 | 13 | 12 | 11 | 10 | 9 | 8 |
| Wake-Up H Bit 3 | Wake-Up H Bit 2 | Wake-Up H Bit 1 | Wake-Up H Bit 0 | Wake-Up G Bit 3 | Wake-Up G Bit 2 | Wake-Up G Bit 1 | Wake-Up G Bit 0 |

SYSTEM POWER MANAGEMENT PARTITIONED ACROSS A SERIAL BUS

CROSS-REFERENCE TO RELATED APPLICATIONS

This application is a continuation in part of co-pending application Ser. No. 08/802,321, filed Feb. 18, 1997, now U.S. Pat. No. 6,058,443 by Dale E. Gulick, entitled "SYSTEM FOR PARTITIONING PC CHIPSET FUNCTIONS INTO LOGIC AND PORT INTEGRATED CIRCUITS" which is incorporated herein by reference. This application relates to the following co-pending, commonly assigned applications, application Ser. No. 08/928,035, entitled "PC CORE LOGIC SERIAL REGISTER ACCESS BUS", by Gulick, and application Ser. No. 08/928,034, entitled "PC CHIPSET WITH USER CONFIGURABLE PROGRAMMABLE LOGIC STRUCTURE" by Gulick, which applications were filed the same day as the present application and which are incorporated herein by reference.

BACKGROUND OF THE INVENTION

1. Field of the Invention

This invention relates to computer systems and more particularly to system power management functions in computer systems.

2. Description of the Related Art

Power management is becoming an increasingly significant consideration in computers systems. For example, some personal computers (PCs) are being designed to be powered on all of the time. Thus, the PC is beginning to adopt modes of operation that are similar in some respects to a video cassette recorder (VCR) which is always powered on but is often in a "sleep" state. Reducing power consumption in order to reduce operating costs and environmental impact of PCs is also a factor being considered. Thus, PCs are adopting increasingly complex power management functions. In addition to placing a PC in a low power or sleep states, power management function must also wake-up the PC from sleep states in response to certain conditions caused by signal levels on external pins or internal timers.

In addition to power management functions becoming more complex, levels of integration have increased as more and more functions have been integrated onto core logic chipsets. For example, such functions as the real time clock, keyboard controller, IDE interface and interface to the universal serial bus (USB) have been integrated onto core logic chipsets. That increasing level of integration causes pin counts to increase, which places pressure on package costs. There exists a need to provide the necessary power management functions in the context of controlling the increasing pin counts.

SUMMARY OF THE INVENTION

Accordingly, the invention provides core logic functions partitioned across two chips interconnected by a serial bus. The serial bus, which is placed in a power savings mode, is used to communicate the existence of a wake-up event from one chip of the partition to another. Accordingly, the invention provides according to one embodiment, an apparatus for system power management. The apparatus includes a first integrated circuit having a first bus interface circuit for interfacing to a bus. The first bus interface circuit is responsive to a reduced power consumption state to maintain each of the signal lines on the bus driven by the first integrated circuit at a fixed voltage level. A second integrated circuit includes a second bus interface circuit for interfacing to the bus. The second bus interface circuit includes a circuit responsive to the reduced power consumption state to maintain each signal line on the bus driven by the second integrated circuit at a fixed voltage. The second interface is responsive to a wake-up event to change a signal line on the bus driven by the second integrated circuit from a first to a second voltage level, thereby providing a wake-up indication to the first integrated circuit indicating that a wake-up event has occurred.

In another embodiment, a method provides an indication to a first integrated circuit that a wake-up event has occurred on an input terminal of a second integrated circuit where the first and second integrated circuit are coupled by a bus. The bus is initially in a reduced power consumption state. One of the signal lines of the bus is changed from a first voltage level to a second voltage level in response to a wake-up event recognized by the second integrated circuit. The bus is changed from the reduced power consumption state to a normal power consumption state in response to the at least one signal line being at the second voltage level.

BRIEF DESCRIPTION OF THE DRAWINGS

The present invention may be better understood, and its numerous objects, features, and advantages made apparent to those skilled in the art by referencing the accompanying drawings, wherein the use of the same reference symbols in different drawings indicates similar or identical items.

FIGS. 10A and 10B show the wake-up select registers.

DESCRIPTION OF THE PREFERRED EMBODIMENT(S)

Figure 1:
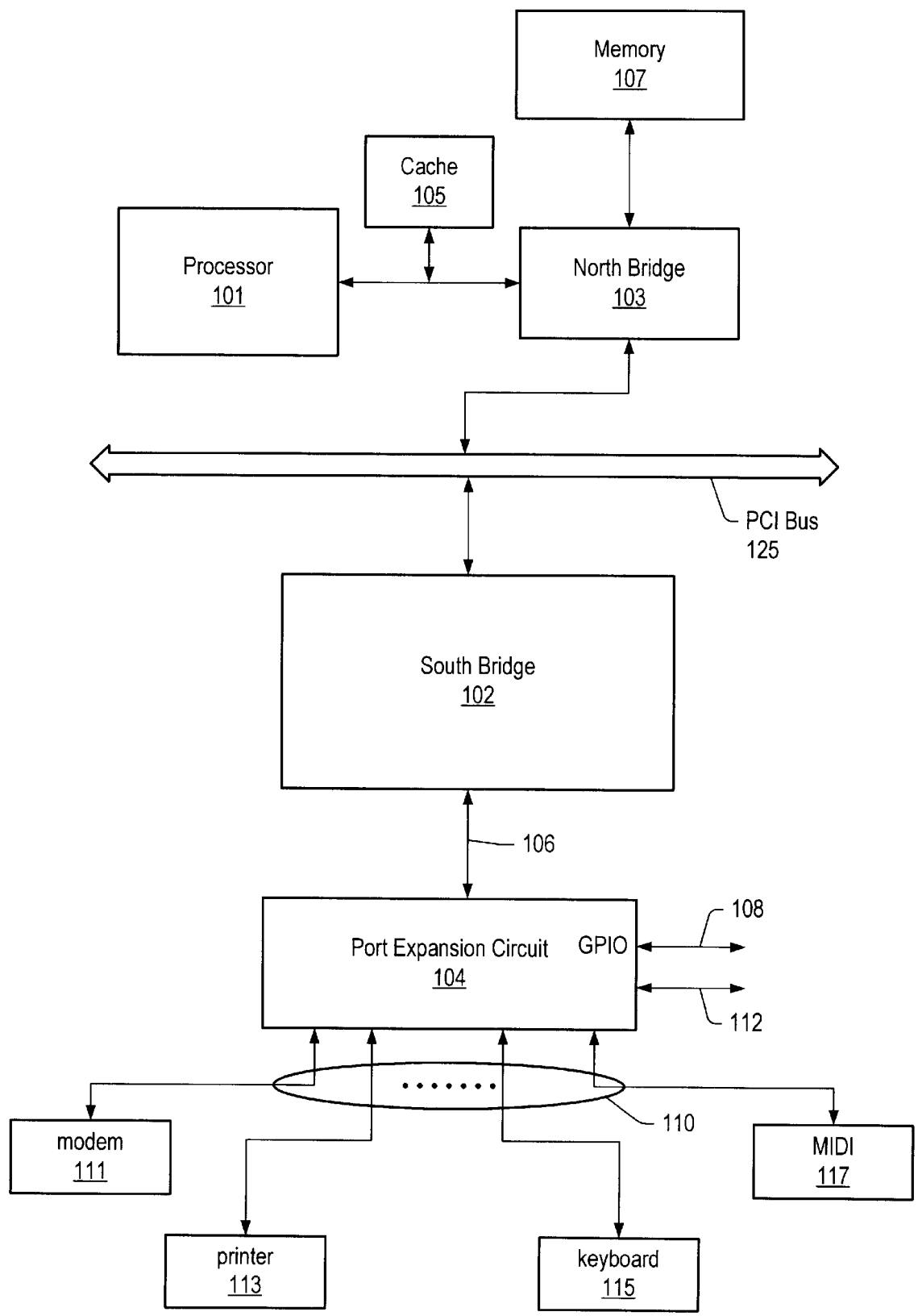
FIG. 1 shows a block diagram of a computer system which includes a South Bridge circuit and port expansion circuit in accordance with the present invention.

FIG. 1 shows a computer system which incorporates one embodiment of the present invention. The computer system includes processor 101 which is coupled to cache memory 105 and memory 107. Bridge circuit 103 (North Bridge), provides an interface (among other functions) between processor 101 and PCI bus 125. North Bridge 103 also provides an interface between the PCI bus 125 and memory 107. Bridge circuit 102 (South Bridge) provides an interface between PCI bus 125 and a plurality of devices and/or interfaces. A separate integrated circuit 104 connects to South Bridge 102 via port expansion bus (PEB) 106. Integrated circuit 104 will be referred to herein as the port expansion circuit (PEC). South Bridge 102 and PEC 104 are connected via port expansion bus 106. Port expansion circuit 104 provides interface logic and/or pins to couple to a variety of devices such as modem 111, printer 113, keyboard 115 and a musical instrument digital interface (MIDI) device 117. The port expansion circuit also provides input/output pins 108 that provide general purpose input/output (GPIO) pins as well as terminals 112 for connection to power buttons such as wake-up and sleep buttons.

The South Bridge and PEC play an active role in power management. The present invention partitions aspects of the power management function across the South Bridge and port expansion chip. Several types of power management functions are performed. The first places the internal logic and the input/output (I/O) pins in the correct states depending on the power mode on the PC. The first type of power management function requires communicating the desired power mode to the PEC via the port expansion bus 106. In order to place the PEC in a sleep state, the communication regarding the power management message can be sent via the register access bus. Details of the serial register access bus are explained in greater detail in the application entitled, entitled "PC CORE LOGIC SERIAL REGISTER ACCESS BUS", application Ser. No. 08/928,035 mentioned previously. The desired power mode may be transferred over the register access bus to a control register located in the port expansion circuit. In that instance, the control register has an ISA address associated with it (which may be remapped from a different address. In another embodiment, the power management commands can be sent over the command channel of the time slot bus as described in application Ser. No. 08/802,321, filed Feb. 18, 1997, by Dale E. Gulick, entitled "SYSTEM FOR PARTITIONING PC CHIPSET FUNCTIONS INTO LOGIC AND PORT INTEGRATED CIRCUITS".

A number of different power management states or desired power modes may exist. For example, power management states may include a normal power on state (a normal power consumption mode), a power off state, a reduced power consumption sleep state in which clocks are stopped. In addition, there may be sleep states in which selected logic is kept active while other logic is in a reduced power consumption state.

One power management approach that has been used in personal computers which are based on 'x86 architecture processors, relates to the system management mode (SMM). SMM is an operating mode of an 'x86 processor entered by way of a system management interrupt (SMI) which is handled by an interrupt service routine. SMM is designed for system control activities such as power management. SMM is primarily targeted for use by the Basic Input Output System (BIOS). The hardware to support SMM is known in the art. In an exemplary embodiment, SMM support includes four timers, GP0 Timer, GP1 Timer, Secondary Event Timer and Conserve Mode Timer.

A newer power management approach is found in the "Advanced Configuration and Power Interface Specification" (ACPI), Version 1.0, Dec. 22, 1996, which is incorporated herein by reference, which specifies hardware and software to provide for operating system control of power management functions. The ACPI specification includes a number of different power consumption states including a G0 (working state), the G1 (sleeping), G2 (soft off) and G3 (mechanical off) states. A system control interrupt (SCI) is used by hardware to notify the OS of an ACPI event.

One goal of the ACPI specification is to move power management functions into the operating system (OS) as opposed to being used by BIOS. While ACPI may be the only power management required for certain newer operating systems, SMM will still be required for older operating systems. As PC system architecture moves from legacy SMM-based power management to ACPI SCI-based power management, transitional legacy support is required. Thus, in a preferred embodiment, both ACPI and system management mode (SMM) power management support is provided in the partitioned chip set described herein. The mode of operation can be selected according to an enable bit. The general purpose input/output pins 108 can be mapped to SMM functions as well as ACPI functions.

The following description highlights selected aspects of the ACPI specification supported by the partitioned chipset in one embodiment of the invention that may be useful in understanding the present invention. Full details can be found in the ACPI specification. The ACPI specification defines user-initiated events that request that the operating system (OS) transition the platform between the G0 (working state) and the G1 (sleeping), G2 (soft off) and G3 (mechanical off) states. The ACPI specification also defines the status and enable bits and defines register groupings that report and/or control various power management functions. In addition, the ACPI specification describes requirements for the power Management Timer, the ACPI buttons, Sleeping/Wake Control, Real Time Clock Alarm, and ACPI CPU Power Control. Detailed descriptions of these requirements can be found in chapter 4, and particularly pages 4–36 through 4–52 of the ACPI specification.

The ACPI specification describes buttons that are supported via the general purpose I/O pins available on the port expansion circuit. ACPI operating systems use power button events to determine when the user is present. The ACPI specification supports two button models. One model is a single-button model in which the single button generates an event for both sleeping and entering the soft-off state. A dual-button model includes a power button which generates a soft-off transition request and a sleeping button which generates a sleeping transition request. Since the choice between these two modes of operation is customer dependent, it is preferable that both be supported in the partitioned chipset described herein.

The power button and sleep button terminals and associated debounce logic are located in the PEC in the described embodiment. The status bits associated with the power and sleep buttons are in the South Bridge. The state of the debounced pins are reflected across the PEB time-slot bus. The four second power override function described in the ACPI specification is implemented on the South Bridge side of the bus in the power management block. In addition, the ACPI specifies a software-controlled mechanism for controlling the power consumption of the CPU while it is in state G0 (normal operation), details of which can be found in the ACPI specification.

Because most of the legacy PC functions were designed prior to power management being an issue, power-down and software reset programmability were not standard functions within each of the various legacy blocks. That necessitates a set of configuration/power management registers to control the legacy functions. For example, such configuration/power management registers stop clocks to legacy blocks in the South Bridge in a power management mode.

Figure 2:
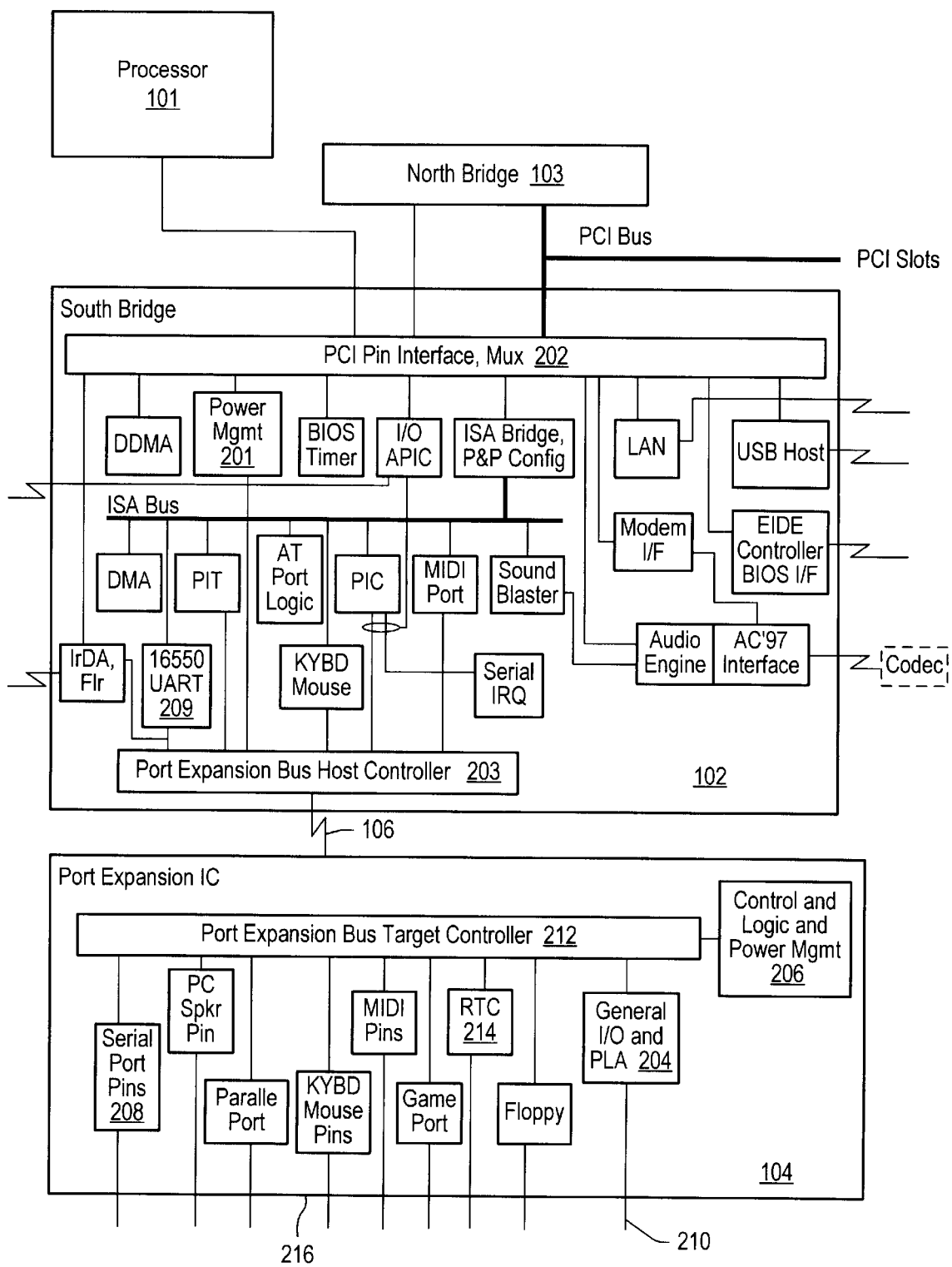
FIG. 2 shows a block diagram of the South Bridge integrated circuit and the port expansion integrated circuit of the computer system shown in FIG. 1.

Referring to FIG. 2, further details of the South Bridge 102 and the port expansion circuit 104 are shown. The power management block 201 in the South Bridge is coupled between PCI interface 202 and port expansion bus host interface 203. In the port expansion circuit 104, the general I/O and PLA block 204 provide programmable control for power management inputs. The power management logic function associated with control of bus 106, as described further herein, is found in block 206.

Figure 3:
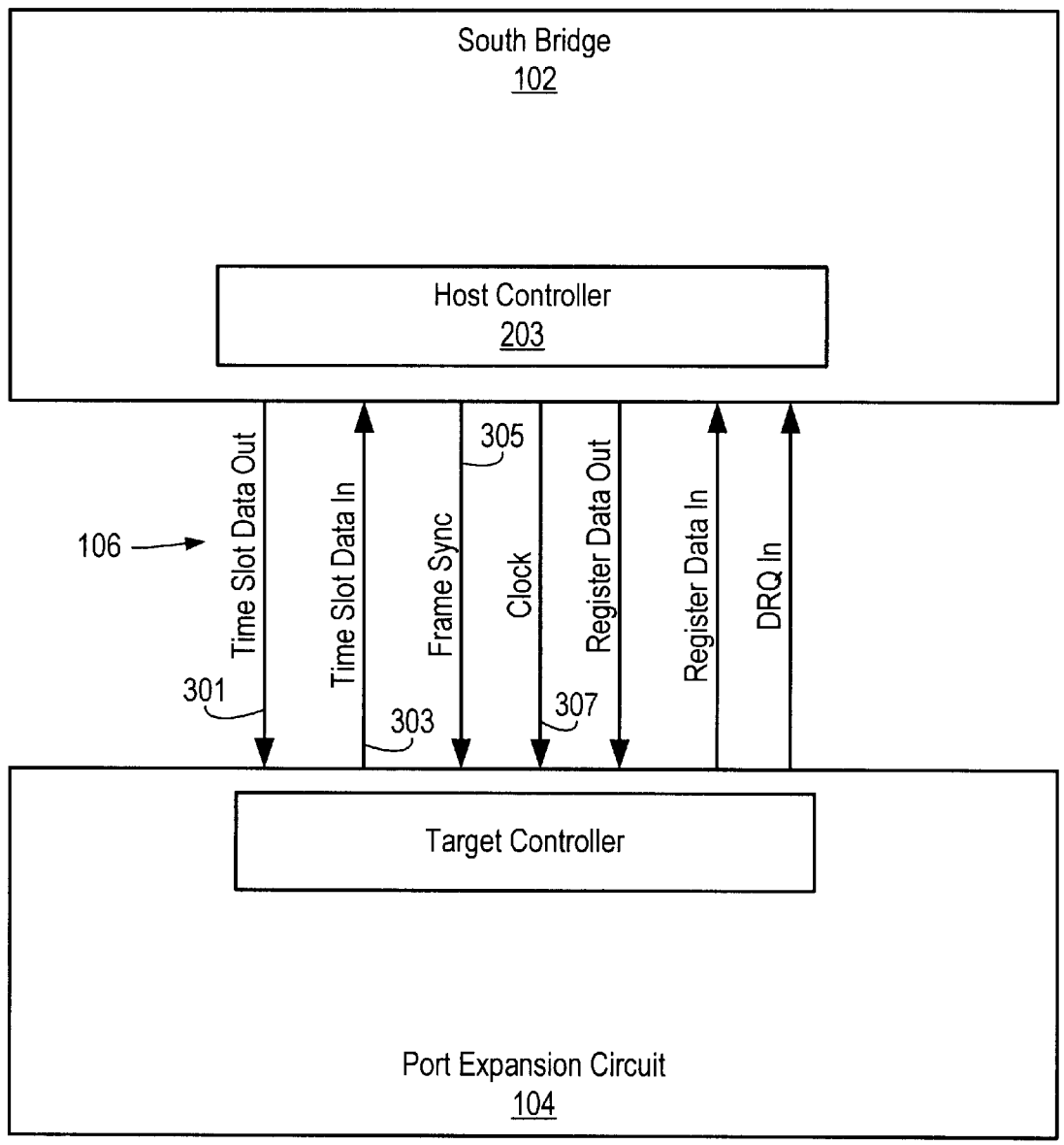
FIG. 3 shows a seven line embodiment of the bus connecting the South Bridge and the port expansion circuit of the computer system of FIG. 1 including a time slot portion and a register transfer portion.

Referring to FIG. 3, the port expansion bus 106 provides a time slot bus for "pin reflection." The time slot bus transfers frames of relatively slowly changing data between the South Bridge 102 and the port expansion circuit 104. In one embodiment each frame has 32 data bits. The time slot bus includes time slot data out signal line 301, time slot data in signal line 303, frame sync 305 and clock 307. The time slot bus transfers relatively slow signals from South Bridge 102 to be output by port expansion circuit 104 on time slot data out signal line 301. The signals are time multiplexed and are provided to the appropriate output pin and thus the output device according to the time slot on the bus. The time slot bus also operates to transfer signals that are received from relatively slow legacy devices, along with general purpose I/O signals and power button signals, from the port expansion circuit to the South Bridge on time slot data in signal line 303.

Figure 4:
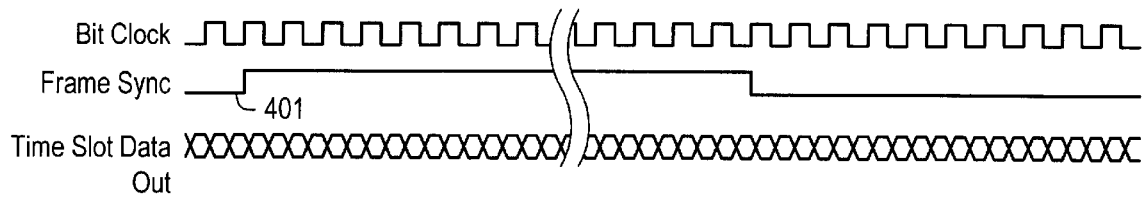
FIG. 4 is a timing diagram showing a frame sync signal for the time slot portion of the port expansion bus (PEB).
Figure 5:
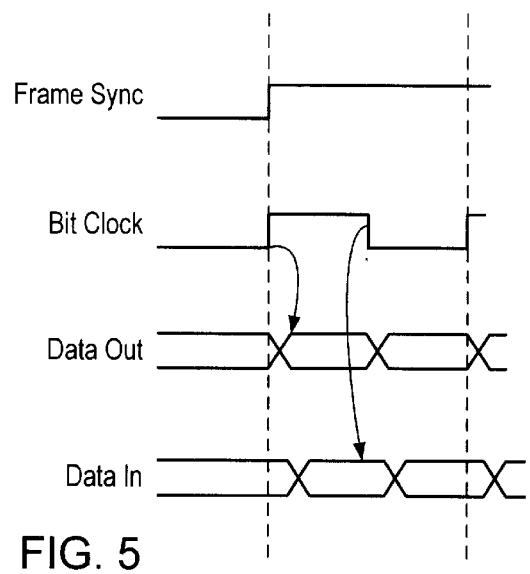
FIG. 5 is a timing diagram showing the relation between the frame sync signal, the bit clock, Data In and Data Out on the port expansion bus.

Referring to FIG. 4, the beginning of each frame is determined by assertion of the frame sync signal at 401 which is synchronous with the bit clock. The frame sync signal is preferably a 50% duty cycle signal and is output from the South Bridge. The frame sync frequency (2.0625 MHz), in one embodiment, is 1/16 that of the bit clock which is a 33 MHz 50% duty cycle clock (same frequency as the PCI clock). Frames are synchronized to the rising edge of the frame sync signal. Data on the time slot bus is synchronized with frame sync with time slot 0 on the bus corresponding to the rising edge of frame sync. As shown in FIG. 5, a data bit is provided on both the rising and falling edge of the clock. Thus, data on signal lines 301 and 303 is transmitted on both the rising and falling edges of the clock. Accordingly, a 32 bit frame requires 16 bit clock periods. In the embodiment shown, bit clock 407 is output from the South Bridge integrated circuit. Note that other frame lengths, clock frequencies and duty cycles are of course possible.

An exemplary frame sent to and from PEC 205 is shown in Table 1. The bits transmitted to the PEC include bits 0–4 which are signals to be provided to the serial port pins on the PEC. Bits 0 and 1 are pin reflection signals including transmit data (TD) for serial ports 1 and 2, request to send (RTS/) and data terminal ready (DTR/) for port 0. The data transmit data bits for serial port 0 and 1 are repeated for bits 6 and 7 and port 1 RTS/ and DTS/ bits are provided in bits 8 and 9. MIDI data is provided on bits 12 and 26. Keyboard and mouse data is provided on bits 27 and 28. A mouse clock out bit is provided on bit 30 and a PC speaker on bit 31. The detailed operation the various ports and interfaces with respect to these control and data bits is well known in the art. The bus speed of the time slot bus should be sufficient to ensure that the various devices receive necessary data and control signals in a timely manner, i.e., the pin reflection function keeps up with the rate of change of the various interfaces.

TABLE 1

| Bit # | Transmit to PEC | Receive from PEC |
|---|---|---|
| 0 | Serial port 0 TD | Serial port 0 RD |
| 1 | Serial port 1 TD | Serial port 1 RD |
| 2 | Serial port 0 RTS/ | Serial port 0 CTS/ |
| 3 | Serial port 0 DTR/ | Serial port 0 DSR/ |
| 4 | Reserved | Serial port 0 DCD/ |
| 5 | Reserved | Serial port 0 RD |
| 6 | Serial port 0 TD | Serial port 1 RD |
| 7 | Serial port 1 TD | Serial port 0 RI |
| 8 | Serial port 1 RTS/ | Serial port 1 CTS/ |
| 9 | Serial port 1 DTR/ | Serial port 1 DSR/ |
| 10 | Reserved | Serial port 1 DCD/ |
| 11 | reserved | Serial port 1 RI |
| 12 | MIDI Tx Data | MIDI Rx Data |
| 13 | Reserved | Wake-up A |
| 14 | Reserved | Wake-up B |
| 15 | Reserved | Wake-up C |
| 16 | Serial port 0 TD | Serial port 0 RD |
| 17 | Serial port 1 TD | Serial port 1 RD |
| 18 | Reserved | Power button |
| 19 | Reserved | Sleep button |
| 20 | Reserved | Reserved |
| 21 | Reserved | Reserved |
| 22 | Reserved | Wake-up D |
| 23 | Reserved | Wake-up E |
| 24 | Serial port 0 TD | Serial port 0 RD |
| 25 | Serial port 1 TD | Serial port 1 RD |
| 26 | MIDI Tx Data | MIDI Rx Data |
| 27 | Keyboard Data Out | Keyboard Data In |
| 28 | Mouse Data Out | Mouse Data In |
| 29 | Keyboard Clock Out | Wake-up F |
| 30 | Mouse Clock Out | Wake-up G |
| 31 | PC Speaker | Wake-up H |

Table 1 also shows the bits received from the PEC. Bits 0–11, 16 and 17, 24 and 25 relate to the serial port. Included in the signals received are receive data (RD), clear to send (CTS), data set read (DSR/), data carrier detect (DCD), ring indicator (RI). The receive frame also includes MIDI receive data (bits 12 and 26). The receive frame includes several bits associated with power control features including wake-up bits 13–15, 22–23, and 29–21 and power and sleep buttons 18 and 19. The power and sleep buttons correspond to the ACPI specified two button model. If the system is in a sleep state, the wake-up buttons can indicate which event caused the wake-up to occur. In addition, the receive frame includes data from the keyboard and mouse (bits 27 and 28, respectively).

Thus, every frame includes the data and control bits shown in Table 1. All bits in Table 1 are numbered with respect to the leading edge of frame sync. The time slot bus is "protocol free", in that there is little overhead associated with transferring data. The bus simply continuously transfers frames between the port expansion circuit and the South Bridge. In the embodiment shown, the frames are contiguous in that there is no time between each frame, i.e., the start of bit 0 is one half clock period from the start of bit 31. However, other embodiments may provide some time periods between frames so long as the time slot bus stays substantially continuously running to satisfy the speed requirements of the pin reflection approach described herein. Note that the I/O pin values are transferred every frame whether they change or not.

Figure 6:
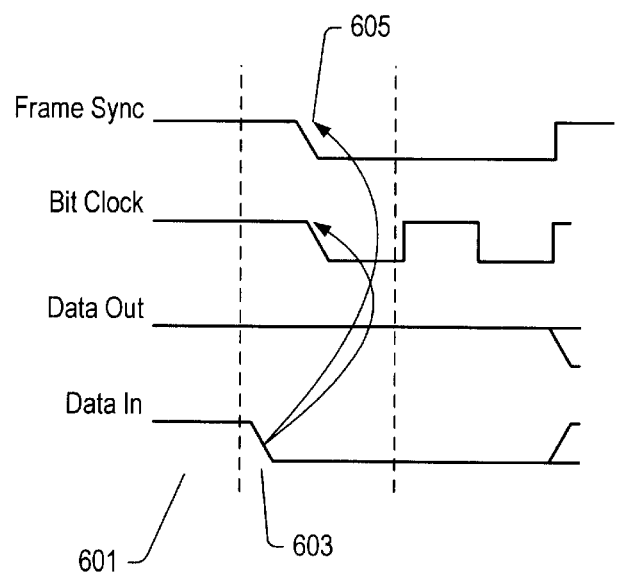
FIG. 6 shows a timing diagram for the time slot bus waking up from a power savings state.

Over particular relevance to the present invention, the time slot bus does not operate while the port expansion circuit and South Bridge are in a power down mode to reduce power consumption. When the South Bridge and port expansion circuit are in a reduced power consumption state, the time slot bus is also maintained in a sleep state by driving the signal lines to a fixed voltage and stopping the clock line. Referring to FIG. 6, when the time slot bus is stopped to reduce power consumption as shown at region 601, the frame sync line, bit clock, data in and data out signal lines are all kept at a fixed voltage level. In the embodiment shown, all of the signal lines on the bus are kept at a high voltage level. Thus, when the sleep state is communicated to the PEC and the South Bridge, the PEB goes into a low power mode in which the clock is inactive. The time slot bus can remain in that low power consumption mode until a wake-up event occurs.

If the bus is sleeping, a way must be provided for the PEC to request that the South Bridge start up the port expansion bus including the bit clock and the frame sync signal. Referring again to FIG. 6, the time slot bus is shown in its low power consumption state or sleep state at 601. As described previously, in the low power consumption state, the bus signals are kept at a fixed voltage.

Activity on pins of the PEC may require that logic blocks in the South Bridge or the entire PC system be woken up. Thus, there must be a way for the PEC, in a sleep state to wake up the South Bridge while it is in a sleep state. For example, activity on the control pins of a COM port (serial port pins 208 in FIG. 2), say the Ring Indicate pin, must wake the PC system from sleep mode. While the I/O pins 208 for the COM port may reside on the port expansion circuit (see FIG. 2), the control logic for the COM port may be in the South Bridge at 209 and the information to and from the pins is reflected across the time slot bus. In response to activity on the COM port pins 208, the port expansion bus target controller circuit 212 requests the South Bridge wake-up by pulling Data In low (Data In is an output from the PEC to the South Bridge) as shown at 603. In response, the South Bridge pulls frame sync low and activates the bit clock at time 605. Thus, in a sleep state, the port expansion bus host controller 203 responds to the data in signal 303 being pulled low by reactivating the bus. In the embodiment shown, the data in 303 is kept low until frame sync 305 goes is driven low. Frame sync 305 should be driven low for a length of time, e.g., one clock period as shown in FIG. 6, before it can go high (signifying the start of a frame), thereby activating the bus. Note that while the protocol for waking up have been described with respect to specific polarities, other polarities can also be used depending upon, e.g., the choice of voltage levels for indicating assertion of a signal.

The ring indicate signal may be routed to the bus activation logic from the UART pins on the port expansion circuit to cause a wake-up sequence to be initiated by the port expansion chip. Alternatively, the ring indicate signal could be routed to general purpose input/output pins.

Referring again to FIG. 2, general purpose input/output pins 210 are coupled to programmable logic circuit 204. Pins 210 provide a number of general purpose input/output (I/O) pins that can be accessed and controlled via software executed on processor 101. The general purpose I/O pins provide flexibility because the pins are coupled to a programmable logic circuit. Details on the general purpose I/O pins and programmable logic circuit can be found in application Ser. No. 08/928,034, entitled "PC CHIPSET WITH USER CONFIGURABLE PROGRAMMABLE LOGIC STRUCTURE" by Gulick.

Figure 7:
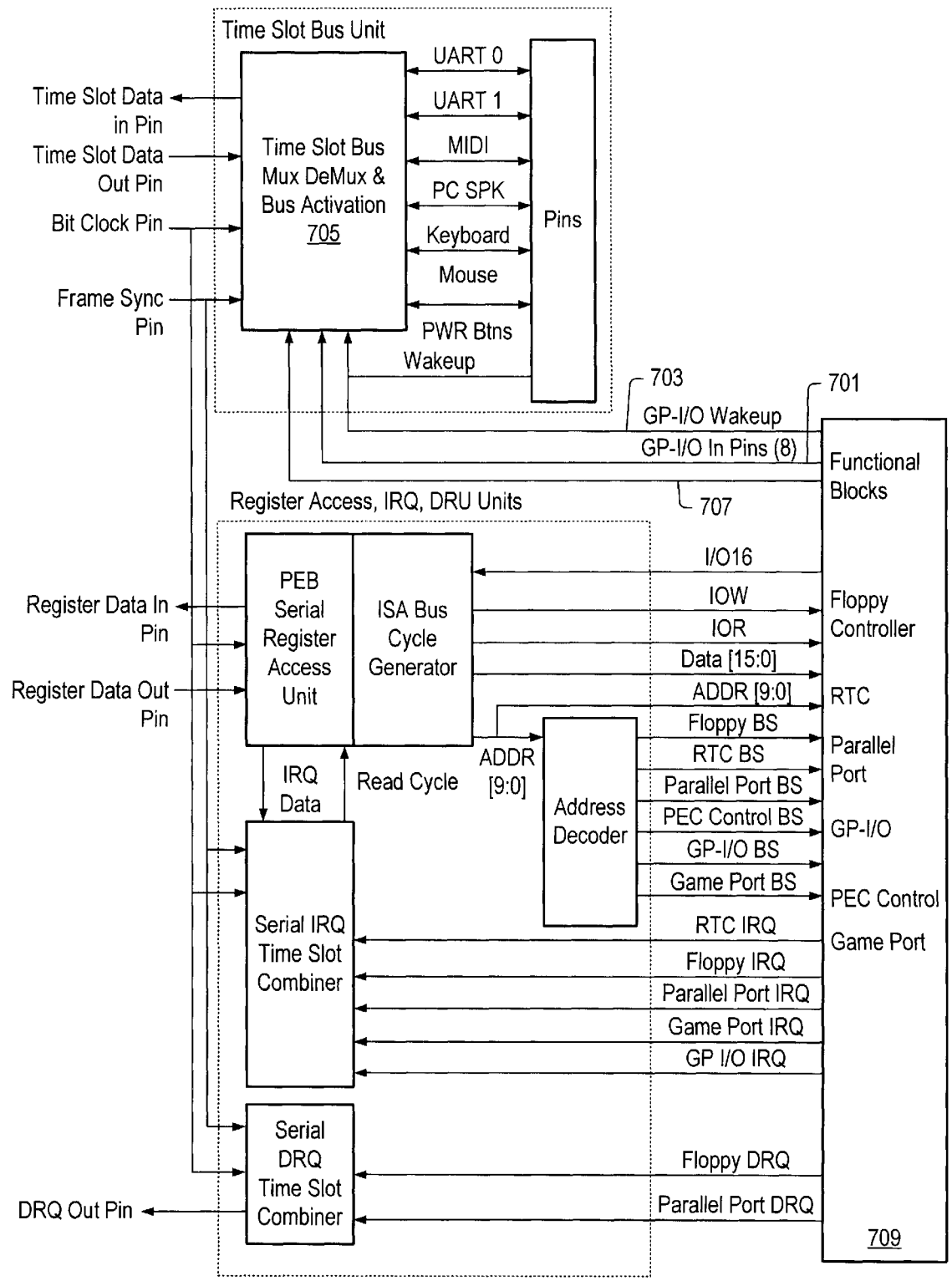
FIG. 7 shows another view of the port expansion circuit.

Referring to FIG. 7, the general purpose I/O signals 701 and wake-up signals 703 are provided to time slot bus mux/demux and bus activation logic 705 which activates the time slot data in signal when programmable wake-up events occur in the general purpose I/O functional block 204 (FIG. 2). An internal event could also cause a wake-up event. For example an alarm from real time clock (RTC) 214 could case a wake-up event in which case an indication is provided on signal line 707 (FIG. 7) to the bus activation logic 705. In addition to activity in the functional blocks causing wake-up events, activity on other pins of the port expansion circuit can cause wake-up events. For example, activity on keyboard or mouse pins 216, certain signals from the UART pins (ring indicate) can also generate wake-up events.

Figure 8:
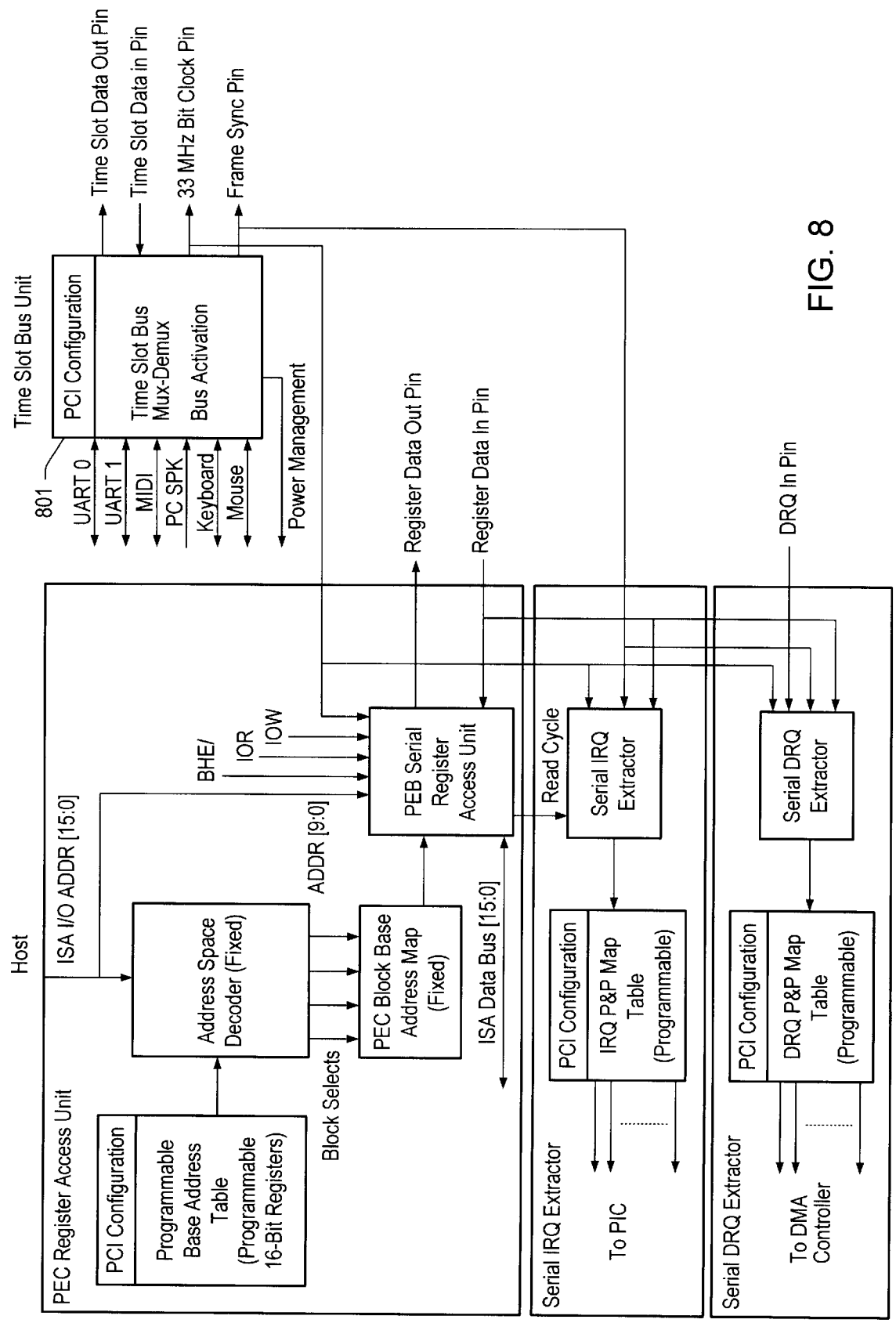
FIG. 8 shows a more detailed block diagram of the host controller 203 shown in FIG. 2.

Referring to FIG. 8, the host (South Bridge) side of the time slot bus is shown at 801. The time slot bus unit 801 is responsive to the data in pin going low during a sleep state to reactivate the clock and frame sync signal, as well as providing the data out signal when the frame starts. Such functions can be implemented with well known design techniques such as state machines.

Figure 9:
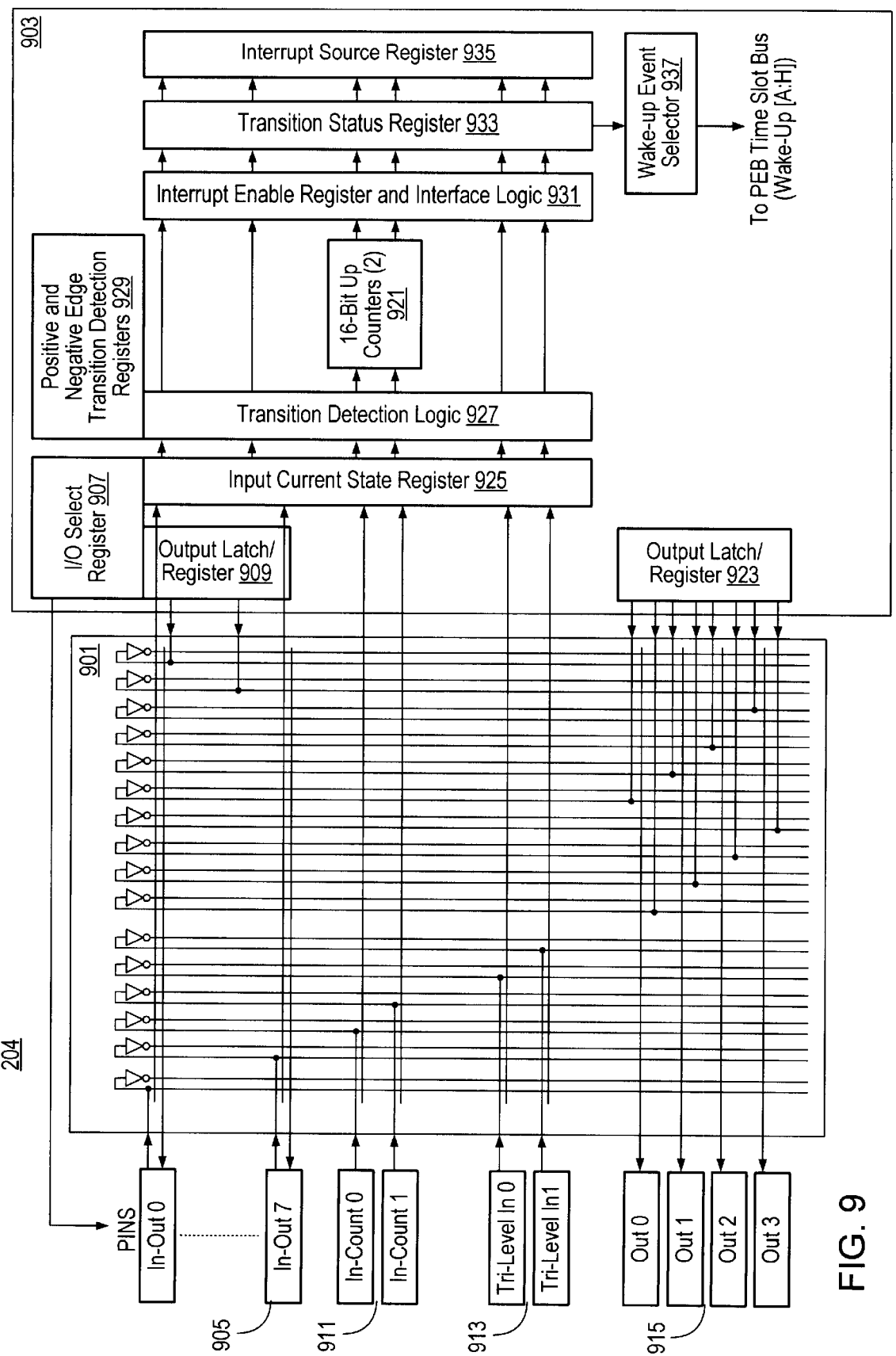
FIG. 9 shows a more detailed diagram of the general I/O an PLA block 204 shown in FIG. 2.

A number of wake-up events can be defined to transition the logic from a sleep state to a powered up state. These wake-up events are communicated over the time slot bus to the South Bridge as described in relation to Table 1. Because these wake-up events may occur on the port expansion chip, their existence must be communicated to the South Bridge. Referring to FIG. 9, eight two level general purpose I/O pins 905 and two count input I/O pins 911, are provided which can cause a wake-up event. A wake-up select register is provided to programmably select which of the general purpose I/O pins are mapped to each of the wake-up time slots A–H shown in Table 1. Examples of the types of signals that could be provided to the general I/O inputs include IEEE 1394 bus activity, a device bay signal, or even a cover open signal. As previously stated, the ring indicate signal could also be routed to a general I/O input pin.

Referring to FIG. 10A, the wake up select register is shown. Bits (3:0) are used to select which of the inputs will drive the wake-up A time slot. The time slot will reflect the state of the transition status bit associated with the selected inputs. In one embodiment, a particular input is selected for inclusion in the time slot bus as shown in Table 2

TABLE 2

| BITS 3,2,1,0 | Mapping |
| --- | --- |
| 0000 | In0 |
| 0001 | In1 |
| 0010 | In2 |
| 0011 | In3 |
| 0100 | In4 |
| 0101 | In5 |
| 0110 | In6 |
| 0111 | In7 |
| 1000 | Reserved |
| 1001 | Reserved |
| 1010 | Reserved |
| 1011 | Reserved |
| 1100 | Reserved |
| 1101 | Count0 |
| 1110 | Count1 |
| 1111 | Not Used |

In a similar manner, bits (7:4) select which input will drive the wake-up B time slot. Bits (11:8) select which input will drive the wake-up C time slot. Bits (15:12) select which input will drive the wake-up D time slot. The time slots reflect the state of the transition status bit associated with the selected inputs. A second set of wake-up bits can be selected by a second wake-up select register as shown in FIG. 10B. Bits (3:0) select which of the inputs which input will drive the wake-up E time slot. Bits (7:4) select which input will drive the wake-up F time slot. Bits (11:8) select which input will drive the wake-up G time slot. Bits (15:12) select which input will drive the wake-up H time slot. The time slots reflect the state of the transition status bit associated with the selected inputs. The inputs are selected according to Table 2.

Note that specific inputs on the general I/O pins can be programmed via interrupt enable register 931 to cause interrupts. Interrupts from specific I/O pins can be assigned via the wake-up select registers via to generate wake-up events. Note that wake-up events that occur on any of the ports or interrupts caused by the general I/O pins while the PEC is in a power savings mode causes the port expansion bus to transition to an active status. Thus, enough of the circuitry of the various ports must be sufficiently "on" in order to respond to such events.

The description of the invention set forth herein is illustrative, and is not intended to limit the scope of the invention as set forth in the following claims. For instance, the number of events that can be programmed to cause wake-up events or that generate wake-up events internally in the port expansion circuit can vary. Additionally, the number and type of input/output pins can vary in different embodiments. Some or all of the input pins could be hard wired to cause wake-up events rather than be programmable. Although the tri-level pins may not cause a wake-up events in some embodiments, other embodiments could include those tri-level input signals as potential wake-up signals. Variations and modifications of the embodiments disclosed herein, may be made based on the description set forth herein, without departing from the scope and spirit of the invention as set forth in the following claims.

What is claimed is:

1. A method of providing an indication to a first integrated circuit that a wake-up event has been detected by a second integrated circuit, the first and second integrated circuits being coupled by a bus having signal lines including a bus clock, a data in signal line and a data out signal line, the method comprising:

placing the bus in a reduced power consumption state wherein the signal lines, including the bus clock, are inactive;

signaling the existence of the wake-up event to the first integrated circuit by changing at least one signal line of the bus from a first voltage level to a second voltage level while the bus clock is inactive, in response to the wake-up event detected by the second integrated circuit;

changing the bus from the reduced power consumption state to a normal power consumption state in response to the one signal line being at the second voltage level, the normal power consumption state including the bus clock being active; and operating the bus in the normal power consumption state in which the signal lines transmit information in synchronism with the bus clock.

2. The method as recited in claim 1 wherein the first voltage level is the reduced power consumption state of the at least one signal line.

3. The method as recited in claim 1 wherein the at least one signal line is a unidirectional data line providing data from the second to the first integrated circuit, during the normal power consumption state.

4. The method as recited in claim 1 wherein the bus includes a frame sync signal line indicating a beginning of a frame of data, and wherein the data out signal line provides data to the second integrated circuit in the normal power consumption state and the data in signal line provides data to the first integrated circuit in the normal power consumption state and placing the bus in a reduced power consumption state includes placing the frame sync signal line, the bus clock, the data out signal line and the data in signal line at the first voltage level.

5. The method as recited in claim 1 wherein the bus a serial bus.

6. The method as recited in claim 1 wherein the wake-up event is caused by activity on a pin of the second integrated circuit.

7. The method as recited in claim 1 wherein the wake-up event is caused by internal activity on the second integrated circuit.

8. The method as recited in claim 2 wherein changing the from the reduced power consumption state includes activating a clock signal, the clock signal being at one of the first and second voltage levels during the bus reduced power consumption state.

9. The method as recited in claim 3 further comprising:

the first integrated circuit changing the voltage level of a control line of the bus from a voltage level at which the control line is maintained during the reduced power consumption state to a different voltage level to indicate the bus is being brought to the normal power consumption state.

10. The method as recited in claim 4 wherein the one signal line changed from the first to the second voltage level to signal the existence of the wake-up event to the first integrated circuit, is the data in signal line.

11. The method as recited in claim 5 wherein identification of a source of the wake-up event is transmitted serially from the second to the first integrated circuit over the bus on resumption of the normal power consumption mode.

12. The method as recited in claim 7 wherein the internal activity is an alarm of a real time clock.

13. The method as recited in claim 10 further comprising:

starting the clock signal in response to changing the data in signal line from the first to the second voltage level;

changing the frame sync signal from the first to the second voltage level in response to changing the data in signal from the first to the second voltage level to signal the existence of the wake-up event to the first integrated circuit; and then maintaining the frame sync signal at the second voltage level for a predetermined period of time before resuming data transfers in the normal power consumption state by bringing the frame sync signal back to the first voltage level and beginning transfer of data across the data in signal line and data out signal line in the normal power consumption state.

14. The method as recited in claim 13 wherein the predetermined time period is at least one period of the clock.

15. An apparatus for system power management comprising:

a first integrated circuit including a first bus interface circuit for interfacing to a bus, the first bus interface circuit being responsive to a reduced power consumption state to maintain each of the signal lines on the bus driven by the first bus interface circuit in an inactive state;

a second integrated circuit including a second bus interface circuit for interfacing to the bus, the second bus interface circuit responsive to the reduced power consumption state to maintain a signal line on the bus driven by the second integrated circuit in the inactive state; and wherein the second bus interface circuit is responsive to a wake-up event to change the signal line on the bus driven by the second integrated circuit from a first to a second voltage level, thereby providing a wake-up indication to the first integrated circuit indicating that a wake-up event has occurred.

16. The apparatus as recited in claim 15 wherein the first bus interface circuit is responsive to the wake-up indication to drive the signal lines on the bus driven by the first integrated circuit in a normal power consumption mode.

17. The apparatus as recited in claim 15 wherein the first integrated circuit is responsive to the reduced power consumption state to drive a frame sync signal line, a clock signal, and a data out signal line and wherein the second integrated circuit is responsive to the reduced power consumption state to drive a data in signal line at unvarying voltage levels.

18. The apparatus as recited in claim 15 wherein the first and second bus interface circuits are for interfacing to a serial bus.

19. The apparatus as recited in claim 16 wherein the normal power consumption mode on the bus includes the first integrated circuit driving a clock signal, a frame sync signal and a data out signal to the second integrated circuit.

20. The apparatus as recited in claim 16 wherein the normal power consumption mode on the bus includes the second integrated circuit driving a data in signal to the first integrated circuit.

21. The apparatus as recited in claim 17 wherein, the first integrated circuit is responsive to the wake-up indication to start the clock signal and to change the frame sync signal from a first to a second voltage level in response to changing the data in signal from the first to the second voltage level; and wherein the first integrated circuit maintains the frame sync signal at the second voltage level for a predetermined period of time before bringing the frame sync signal back to the first voltage level to begin transfer of data across the data in signal line and data out signal line in the normal power consumption state.

22. The apparatus as recited in claim 20 wherein the data in signal to the first integrated circuit carries bits representing a source of the wake-up event, the bits being transferred serially.

23. In a computer system including a first and second integrated circuit connected by a serial bus having a plurality of signal lines, including a first unidirectional data line from the first to the second integrated circuit, a second unidirectional data line from the second to the first integrated circuit, the clock line and a control line, a method comprising:

maintaining the bus in a power savings mode wherein the signal lines are kept quiescent at a first voltage corresponding to the power savings mode;

communicating the existence of a wake-up event detected by the second integrated circuit to the first integrated by changing the second unidirectional data line, from the first to a second voltage while the remaining signal lines, including the clock line, are maintained in the power savings mode; and restarting the clock provided on the clock line in response to the changing of the second unidirectional data line from the first to the second voltage.

24. The method as recited in claim 23 wherein the identification of a source of the wake-up event is transmitted from the second to the first integrated circuit over the bus on resumption of a normal power consumption mode over the second unidirectional data line, and wherein the bus provides data and control information during the normal power consumption mode.

* * * * *

UNITED STATES PATENT AND TRADEMARK OFFICE
CERTIFICATE OF CORRECTION

PATENT NO.   : 6,601,178 B1
DATED        : July 29, 2003
INVENTOR(S)  : Dale E. Gulick It is certified that error appears in the above-identified patent and that said Letters Patent is hereby corrected as shown below:

<u>Column 10,</u>
Line 15, please insert -- bus -- after "the".

Signed and Sealed this

Sixteenth Day of December, 2003

JAMES E. ROGAN
*Director of the United States Patent and Trademark Office*